(12) United States Patent
Iwabuchi et al.

(10) Patent No.: US 12,647,801 B2
(45) Date of Patent: Jun. 2, 2026

(54) RELAY CONTROL SYSTEM, RELAY APPARATUS, AND RELAY CONTROL METHOD

(71) Applicant: NTT, Inc., Tokyo (JP)

(72) Inventors: Masashi Iwabuchi, Musashino (JP);
Tomoaki Ogawa, Musashino (JP);
Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 355 days.

(21) Appl. No.: 18/293,365

(22) PCT Filed: Aug. 6, 2021

(86) PCT No.: PCT/JP2021/029366
§ 371 (c)(1),
(2) Date: Jan. 30, 2024

(87) PCT Pub. No.: WO2023/013049
PCT Pub. Date: Feb. 9, 2023

(65) Prior Publication Data
US 2024/0373249 A1      Nov. 7, 2024

(51) Int. Cl.
*H04W 16/28* (2009.01)
*H01Q 3/46* (2006.01)
(Continued)

(52) U.S. Cl.
CPC ........ *H04W 16/28* (2013.01); *H04B 7/04013* (2023.05); *H04B 7/063* (2013.01); *H01Q 3/46* (2013.01)

(58) Field of Classification Search
CPC ...... H01Q 3/46; H04B 7/04013; H04B 7/063; H04B 7/145; H04W 16/28
See application file for complete search history.

(56) References Cited

U.S. PATENT DOCUMENTS

| | | | |
|---|---|---|---|
| 10,419,948 B1 * | 9/2019 | Labadie | H01Q 3/005 |
| 2022/0158363 A1 * | 5/2022 | Achour | H04B 7/04013 |

FOREIGN PATENT DOCUMENTS

| | | | | |
|---|---|---|---|---|
| WO | WO-2016134751 A1 * | 9/2016 | | H01Q 19/104 |

OTHER PUBLICATIONS

Chung et al., "Adaptive Beamwidth Control for mmWave Beam Tracking", IEEE Communications Letters, vol. 25, No. 1, Jan. 2021, pp. 137-141.

(Continued)

*Primary Examiner* — Nguyen T Vo

(74) *Attorney, Agent, or Firm* — XSENSUS LLP

(57) ABSTRACT
A reflection unit of a relay apparatus includes a plurality of reflection elements capable of applying independent phase shifts to an incoming wave from a transmission point. The reflection unit estimates a distance between the relay apparatus and a reception point based on terminal information transmitted from the reception point. The number of divisions for grouping the plurality of reflection elements is determined based on the distance. The plurality of reflection elements are grouped into one or more reflection element groups according to the division number. The position of the reception point is estimated based on the terminal information. Each of the reflection element is applied a phase weight so that each of the reflection element groups generates a beam toward the position of a reception point.

16 Claims, 13 Drawing Sheets

(51) Int. Cl.
   H04B 7/04          (2017.01)
   H04B 7/06          (2006.01)

(56)                    References Cited

OTHER PUBLICATIONS

Basar et al., "Wireless Communications Through Reconfigurable Intelligent Surfaces", IEEE Access, vol. 7, No. 2019, Aug. 13, 2019, pp. 116753-116773.
Wu et al., "Intelligent Reflecting Surface Enhanced Wireless Network via Joint Active and Passive Beamforming", IEEE Transactions on Wireless Communications, vol. 18, No. 11, Nov. 2019, pp. 5394-5409.

\* cited by examiner

RECEPTION POWER ————

POSITION ERROR TOLERANCE - - - -

RIS-UE DISTANCE

Fig. 8

| TERMINAL DISTANCE | NUMBER OF ELEMENTAL GROUPS |
|---|---|
| CC m OR MORE | 1 |
| BB~CC m | 2 |
| AA~BB m | 4 |
| LESS THAN AA m | 8 |

RELAY CONTROL SYSTEM, RELAY APPARATUS, AND RELAY CONTROL METHOD

CROSS-REFERENCE TO RELATED APPLICATION

The present application is a national stage application, pursuant to 35 U.S.C. § 371, of International Patent Application No. PCT/JP2021/029366, filed Aug. 6, 2021, the entire contents of which are incorporated herein by reference.

TECHNICAL FIELD

The present disclosure relates to a relay control system, a relay apparatus, and a relay control method, and in particular, to a relay control system, a relay apparatus, and a relay control method using a reconfigurable intelligent surface as a relay device for wireless communication.

BACKGROUND ART

NPL 1 below discloses a method of beam tracking in millimeter wave communication. More specifically, NPL 1 discloses a method for appropriately controlling the beam width in beam tracking in order to prevent the performance of wireless communication from being deteriorated by the combination of high mobility and narrow beam width.

Further, NPL 2 and NPL 3 below disclose a technique for improving the coverage of a transmission point using a reconfigurable intelligent surface (RIS) as a relay apparatus for wireless communication.

CITATION LIST

Non Patent Literature

[NPL 1] Adaptive Beamwidth Control for mmWave Beam Tracking, Hyeonjin Chung, Jeongwan Kang, Hyowon Kim, Young Mi Park, and Sunwoo Kim, p 137-141, IEEE COMMUNICATIONS LETTERS, VOL. 25, No. 1, January 2021
[NPL 2] Wireless Communications Through Reconfigurable Intelligent Surfaces, ERTUGRUL BASAR, MARCO DI RENZO, JULIEN DE ROSNY, MEROUANE DEBBAH, MOHAMED-SLIM ALQUINI, RUI ZHANG, p 116753-116773, VOLUME 7, 2019, IEEE Access, Aug. 13, 2019
[NPL 3] Intelligent Reflecting Surface Enhanced Wireless Network via Joint Active and Passive Beamforming, Qingqing Wu, Rui Zhang, IEEE TRANSACTIONS ON WIRELESS COMMUNICATIONS, p 5394-5409, VOL. 18, No. 11, November 2019

SUMMARY OF INVENTION

Technical Problem

Incidentally, the above-mentioned RIS includes a plurality of two-dimensionally arranged reflection elements in order to obtain a gain by reflection. Then, the RIS can dynamically control the direction of the reflected wave by controlling the phase added to the incoming wave by the individual reflection elements. In this case, channel information between a transmission point and a reception point for transmitting and receiving a radio signal via the RIS is used to determine the phase to be added by the reflection element.

The above-mentioned channel information must be acquired for each reflection element. Therefore, in the relay control system using the RIS, the problem is that the overhead required for acquiring the channel information tends to be large. In order to cope with this problem, a method of sweeping the reflection direction without acquiring channel information can be considered. However, since the beam width formed by the reflection by the RIS is very narrow, the overhead required for the sweep is also increased.

In order to reduce the overhead described above, a method of determining the reflection method using the positional information of the transmission point and the reception point can be considered. However, since the positional information contains estimation errors and the beam width of the RIS is very narrow, a problem with such a method is that it is difficult to keep the radio terminal constituting the receiving point within the coverage of the beam.

The present disclosure has been made in view of the above problems, and a first object of the present disclosure is to provide a relay control system capable of improving reception quality at a reception point while reducing an overhead required for beam search by appropriately controlling a beam width of a reflected wave from a relay apparatus.

In addition, a second object of the present disclosure is to provide a relay apparatus capable of improving reception quality at a reception point while reducing an overhead required for beam search by appropriately controlling a beam width of a reflected wave toward the reception point.

In addition, a third object of the present disclosure is to provide a relay control method capable of improving reception quality at a reception point while reducing overhead required for beam search by appropriately controlling a beam width of a reflected wave by a relay apparatus.

Solution to Problem

In order to achieve the above object, a first aspect is a relay control system using a relay apparatus including a plurality of reflection elements capable of applying independent phase shifts to incoming waves from a transmission point, in which the system is preferably configured to execute
a process of estimating a distance between the relay apparatus and the reception point based on terminal information emitted from the reception point,
a process of determining the number of divisions for grouping the plurality of reflection elements based on the distance,
a process of grouping the plurality of reflection elements into one or a plurality of reflection element groups according to the number of divisions,
a process of estimating a position of the reception point based on the terminal information, and
a phase control process of applying a phase weight to each of the reflection elements so that each of the reflection element groups generates a beam toward the position of the reception point.
In addition, a second aspect is a relay apparatus including a plurality of reflection elements capable of applying independent phase shifts to incoming waves from a transmission point, in which the relay apparatus is preferably configured to execute a process of estimating a distance to the reception point based on terminal information emitted from the reception point, a process of determining the number of divisions for grouping the plurality of reflection elements based on the distance, a process of grouping the plurality of reflection elements into one or a plurality of reflection element groups according to the number of divisions, a process of estimating a position of the reception point based on the terminal information, and a process of applying a phase weight to each of the reflection elements so that each of the reflection element groups generates a beam toward the position of the reception point.

In addition, a third aspect is a relay control method using a relay apparatus including a plurality of reflection elements capable of applying independent phase shifts to an incoming wave from a transmission point, in which the method preferably includes a step of estimating a distance between the relay apparatus and the reception point based on terminal information emitted from the reception point, a step of determining the number of divisions for grouping the plurality of reflection elements based on the distance, a step of grouping the plurality of reflection elements into one or a plurality of reflection element groups according to the number of divisions, a step of estimating a position of the reception point based on the terminal information; and a step of applying a phase weight to each of the reflection elements so that each of the reflection element groups generates a beam toward the position of the reception point.

Advantageous Effects of Invention

According to the first to third aspects, a width and intensity appropriate for setting the reception point within the coverage can be applied to the beam of the reflected wave from the relay apparatus. Therefore, according to these aspects, the reception quality at the reception point can be improved while reducing overhead required for beam search.

BRIEF DESCRIPTION OF DRAWINGS

FIG. 8 illustrates a table in which a relationship between the distance between the relay apparatus and the reception point and the number of reflection element groups to be formed in the reflection unit is determined.

DESCRIPTION OF EMBODIMENTS

Embodiment 1

Configuration of Embodiment 1

Figure 1:
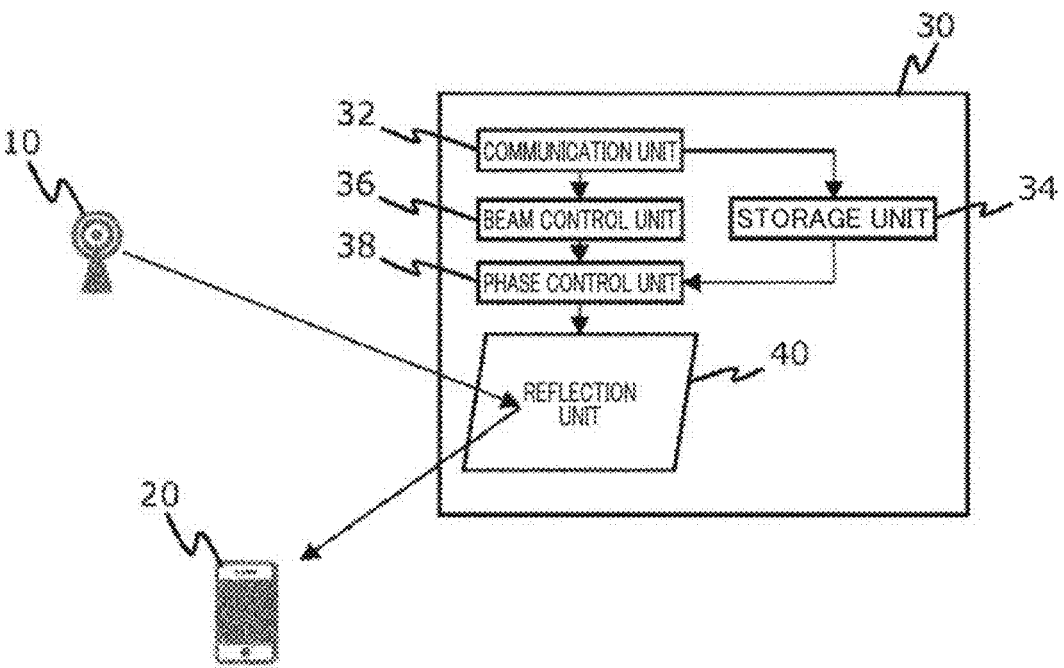
FIG. 1 is a diagram for illustrating a configuration of a relay control system according to Embodiment 1 of the present disclosure.

FIG. 1 illustrates a configuration of a relay control system of Embodiment 1 of the present disclosure. The system illustrated in FIG. 1 includes a transmission point 10, a reception point 20, and a relay apparatus 30. The transmission point 10 is configured of a radio base station or the like under the management of a communication carrier. On the other hand, the reception point 20 is configured by a user terminal (UE) such as a smart phone. The reception point 20 belongs to the communication area of the transmission point 10, and in a case where no obstacle or the like exists between both of them, the reception point 20 can directly communicate with the transmission point 10.

The relay apparatus 30 is configured to have a dynamic reflection plate, that is, a reconfigurable intelligent surface (RIS). The relay apparatus 30 is disposed to relay a radio signal between the transmission point 10 and the reception point 20. Even in a case where direct communication with the transmission point 10 cannot be performed, the reception point 20 may communicate with the transmission point 10 via the relay apparatus 30.

Figure 2:
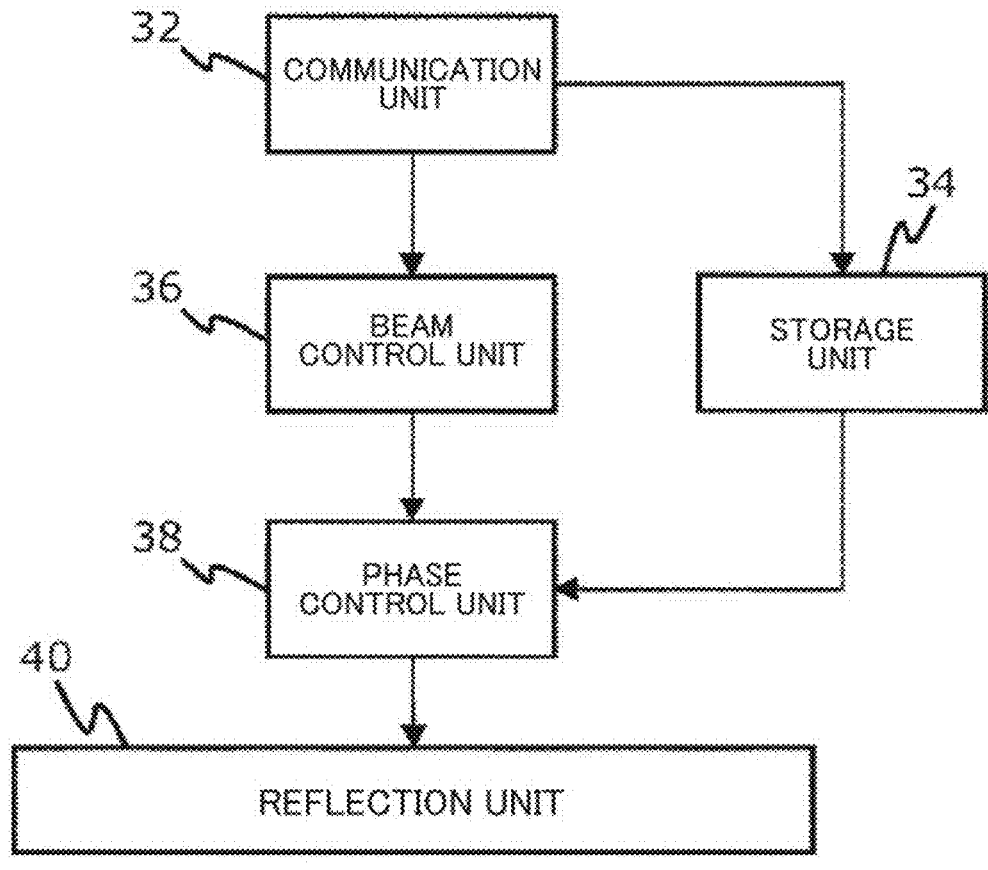
FIG. 2 is a block diagram for illustrating a configuration of a relay apparatus illustrated in FIG. 1.

FIG. 2 is a block diagram for illustrating a configuration of the relay apparatus 30 according to the present embodiment. As illustrated in FIG. 2, the relay apparatus 30 includes a communication unit 32. The communication unit 32 is a block for exchanging control information with the transmission point 10 or the reception point 20 for use in controlling the relay apparatus 30. The control information acquired by the communication unit 32 is provided to a storage unit 34 and a beam control unit 36.

The control information includes, for example, positional information of a user terminal configuring the reception point 20, information of a reception power at the reception point 20, and the like. The beam control unit 36 determines which beam is to be formed by the relay apparatus 30 based on the information. More specifically, it is determined whether a beam having a wide coverage is appropriate if the power reaching the reception point 20 is weak or whether a beam having a high power is appropriate if the beam width is narrow. Then, the characteristics of the beam to be formed are specified and the result is provided to a phase control unit 38.

The phase control unit 38 calculates the phase weights necessary to generate a beam of appropriate width and direction based on the control information read from the storage unit 34 and the information provided from the beam control unit 36, The information of the phase weight calculated by the phase control unit 38 is provided to a reflection unit 40.

Figure 3:
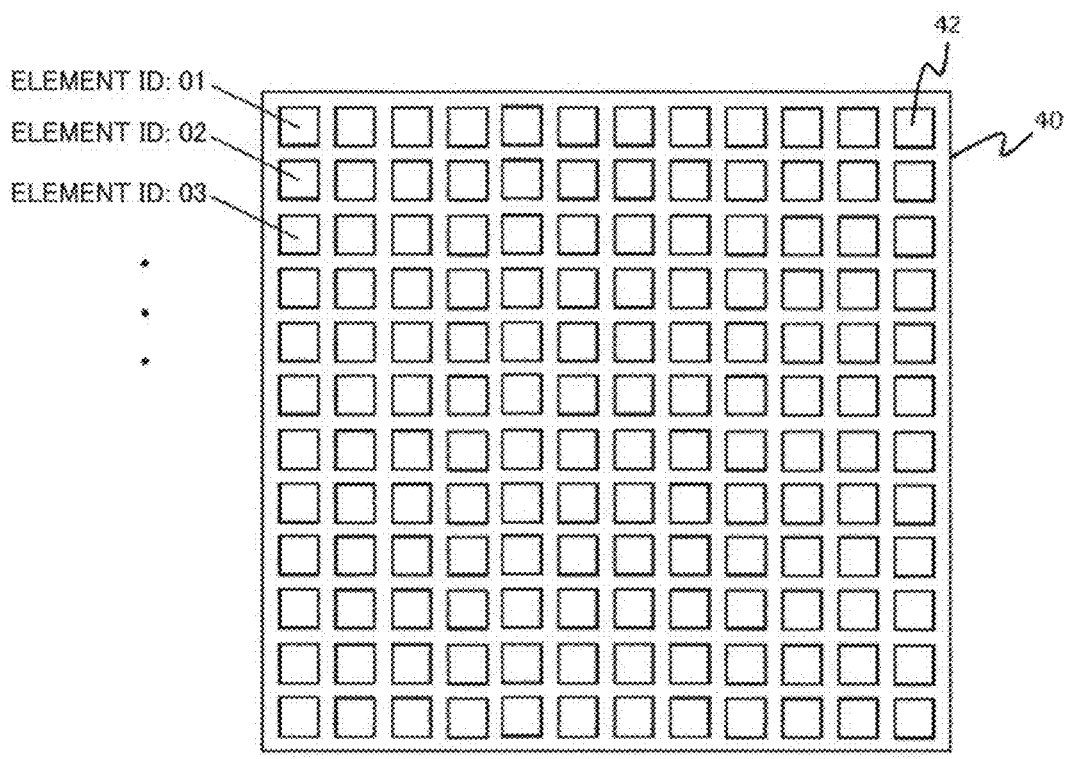
FIG. 3 is a diagram for illustrating a configuration of a reflection unit included in the relay apparatus illustrated in FIGS. 1 and 2.

FIG. 3 is a diagram for illustrating a configuration of the reflection unit 40. As illustrated in FIG. 3, the reflection unit 40 includes a plurality of reflection elements 42. The reflection elements 42 are disposed regularly and two-dimensionally at equal intervals. Each of the reflection elements 42 has a mechanism for reflecting or transmitting radio waves emitted from the transmission point 10. Individual IDs are applied to the reflection elements 42, and they can be controlled independently of each other. More specifically, each of the reflection elements 42 can generate a reflected wave with a desired phase shift by adding a desired phase weight to an incoming wave.

The phase shift can be generated, for example, by connecting a variable phase shifter for applying an arbitrary phase shift to each reflection element 42. Alternatively, the phase shift may be generated using a device capable of controlling the phase in a binary manner by turning on and off the switch. Alternatively, the phase of the incoming wave reflected by the reflection element 42 may be shifted by another method.

The description will proceed with reference to FIG. 2 again. A control signal for each of the reflection elements 42 is provided to the reflection unit 40 from the phase control unit 38. The control signal includes a phase weight command for each of the reflection elements 42. The phase weight can be calculated, for example, by a method of performing channel estimation or a method of using positional information (for example, see Japanese Patent No. 5200090), or other known methods.

Feature of Embodiment 1

Hereinafter, the contents of the processes executed by the relay apparatus 40 will be described in more detail below with reference to FIGS. 4 to 9.

Figure 4:
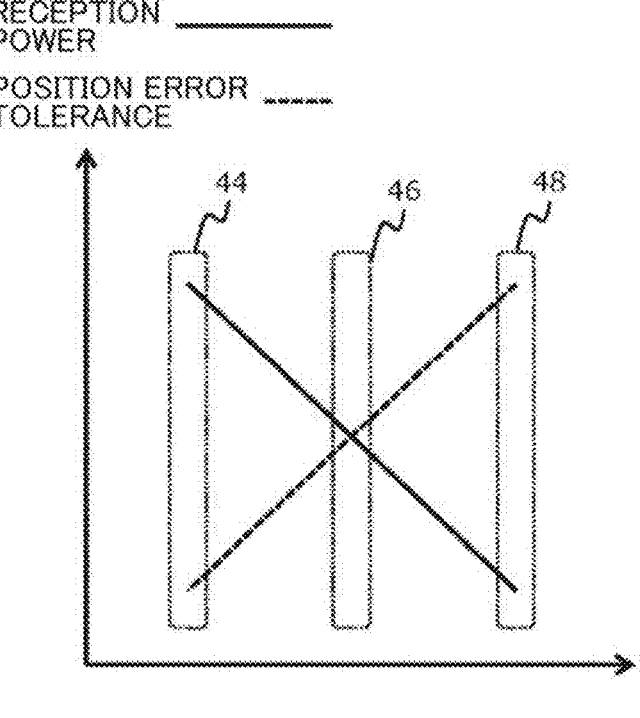
FIG. 4 is a diagram for illustrating an influence of a distance between the relay apparatus (RIS) and a reception point (UE) on the reception power and the positional error tolerance.

FIG. 4 illustrates the influence of the distance between the relay apparatus 30 and the reception point 20 (hereinafter referred to as "RIS-UE distance") on the "reception power" and the "positional error tolerance" at the reception point 20. The intensity of the beam toward the reception point 20 is attenuated in the propagation process. Therefore, as illustrated by a solid line in FIG. 4, the "reception power" at the reception point 20 becomes smaller as the RIS-UE distance becomes longer.

The "positional error tolerance" means the tolerance of coverage to an error included in the "positional information" of the reception point 20. Generally, the "positional information" includes an error. Therefore, the beam of the reflected wave generated by the relay apparatus 40 is not always accurately directed to the reception point 20. On the other hand, the beam of the reflected wave tends to become wider as the propagation distance becomes longer. The wider the beam width, the easier the beam covers the reception point 20. Therefore, as illustrated by a broken line in FIG. 4, the "positional error tolerance" is better as the RIS-UE distance is longer.

In the short-distance region indicated by reference numeral 44 in FIG. 4, a strong reception power can be obtained, but the position error resistance is lowered. Therefore, in order to establish the first contact with the reception point 20 positioned in such a region, the transmission power need not be so strong, but it is desirable to secure a large beam width.

In the middle distance region indicated by reference numeral 46 in FIG. 4, both the reception power and the positional error tolerance are moderate. Therefore, in order to establish the first contact with the reception point 20 positioned in the region 46, it is desirable to generate a beam having a balance between the transmission power and the beam width.

In addition, in the long-distance region 48 illustrated in FIG. 4, although high positional error resistance can be obtained, the reception power becomes weak. Therefore, in order to establish the first contact with the reception point 20 positioned in such region 48, it is desirable to narrow the beam width to generate a beam having a high power.

Figure 5A:
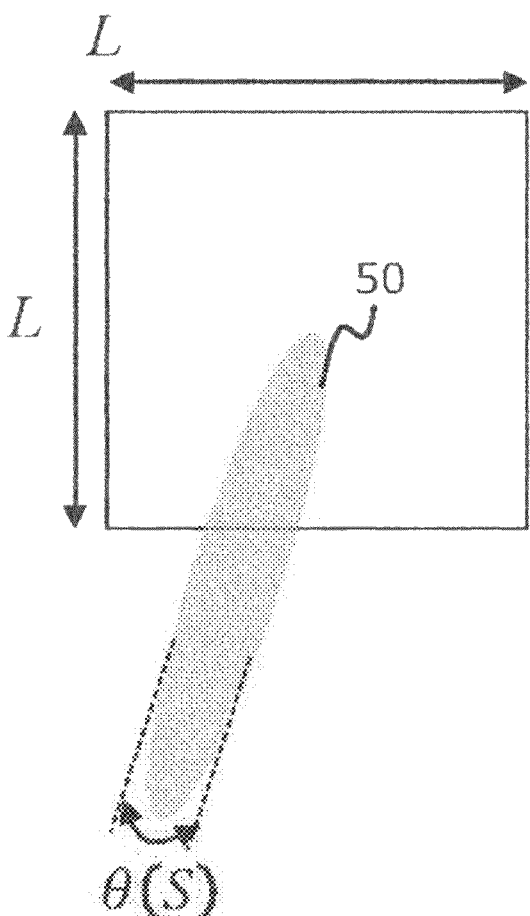
FIG. 5A is a diagram illustrating how the reflection unit of the relay apparatus generates one beam having a beam width θ by reflection on a total area S.

FIG. 5A illustrates a state in which the reflection unit 40 of the relay apparatus 30 generates the beam 50 with a width θ using all the reflection elements 42, that is, by using the total area S. The larger the number of reflection elements 42 used for generation, the stronger the power of the beam. Therefore, in the state illustrated in FIG. 5A, a beam 50 with a narrow width θ and a large power can be generated.

Figure 5B:
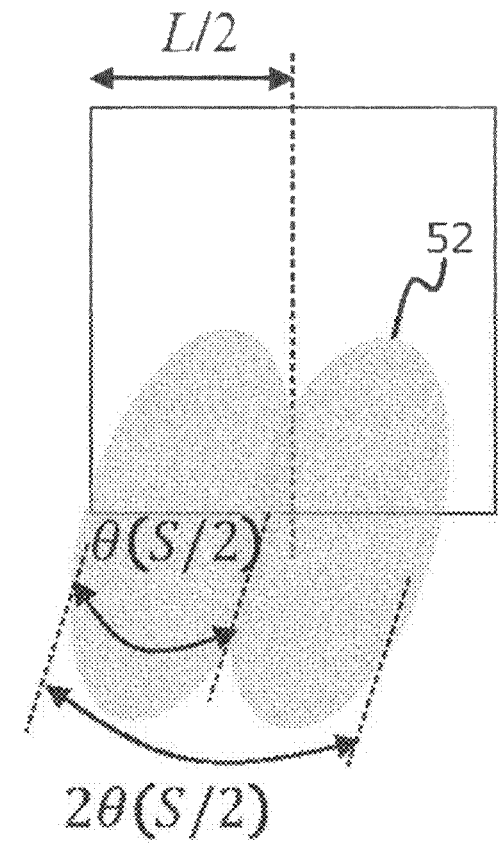
FIG. 5B is a diagram illustrating how the reflection unit of the relay apparatus generates two beams having a beam width of 2θ by reflection for each half area S/2.

FIG. 5B illustrates a state in which the reflection unit 40 divides the area S into two and generates two beams 52 with the width θ. In this case, the power of each beam 52 is approximately half of the beam 50 illustrated in FIG. 5A in accordance with the number of reflection elements 42 used for generation. On the other hand, since two beams are generated, the width covered by them can be approximately twice as large as that illustrated in FIG. 5A.

Figure 5C:
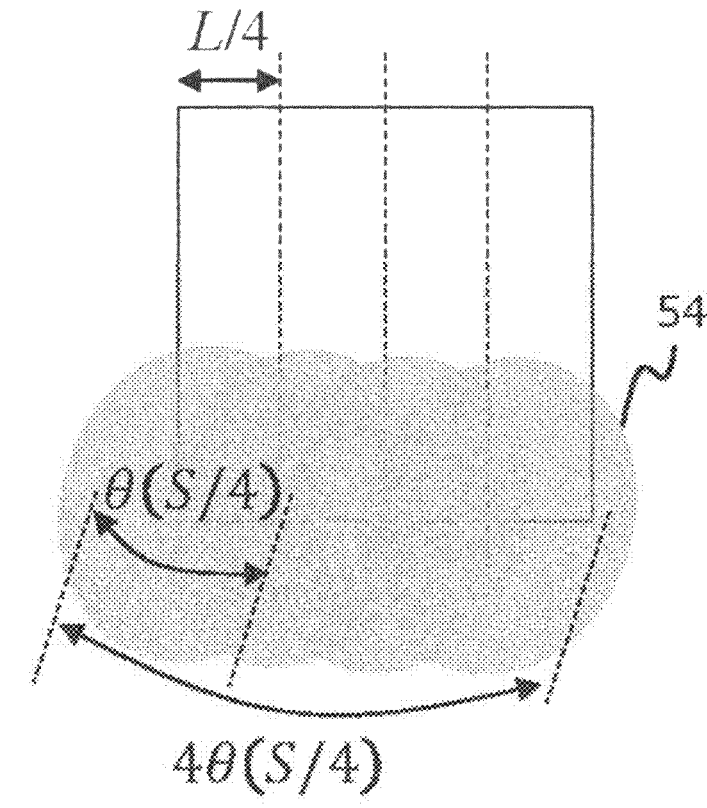
FIG. 5C is a diagram illustrating how the reflection unit of the relay apparatus generates four beams having a beam width of 4θ by reflection for each quarter area S/4.

FIG. 5C illustrates a state in which the reflection unit 40 divides the area S into four and generates four beams 54 with the width θ. In this case, the power of each beam 54 becomes approximately one-fourth of the beam 50 illustrated in FIG. 5A according to the number of reflection elements 42 used for generation. On the other hand, since four beams are generated, the width covered by them can be approximately four times as illustrated in FIG. 5A.

Thus, according to the relay apparatus 30, the beam 50 with a narrow width and a high power and the beam 54 with a wide width and a low power can be separately produced depending on how the plurality of reflection elements 42 included in the reflection unit 40 are grouped. For example, if the beam 50 with narrow strong power is used for a remote reception point 20 and the beam 54 with wide weak power is used for the near reception point 20, regardless of the presence of position error, the first contact with the reception point 20 can be relatively easily established.

Therefore, in the present embodiment, in a case where it is necessary to newly establish communication with the reception point 20, first, as a first step, the relay apparatus 30 is made to execute the following processes to establish the first contact.

(1) The distance to the reception point 20 is determined.

(2) A grouping of the reflection elements 42 is determined to generate beams suitable for coverage of the reception points 20 positioned at the above distances.

(3) According to the above grouping, a phase weight for generating a beam toward the reception point 20 is applied to each of the reflection elements 42.

Further, after the first contact with the reception point 20 has been established, the relay apparatus 30 of the present embodiment changes the features of the beam by obtaining the improvement of the communication quality as a second step. Specifically, the beam width is gradually reduced while correcting the positional information within a range where the reception point 20 does not deviate from the coverage of the beam. That is, the number of groups of the reflection elements 42 forming the beam is reduced. Thus, the beam generated by the relay apparatus 30 gradually has high intensity, is narrow, and accurately changes to the beam to fit the reception point 20 within the coverage. As a result, communication quality between the relay apparatus 30 and the reception point 20 is improved.

The above-mentioned processes in the first and second steps can be executed without requiring a huge overhead. Therefore, according to the system of the present embodiment, it is possible to provide the reception point 20 with excellent reception quality while reducing overhead required for beam search.

Figure 6:
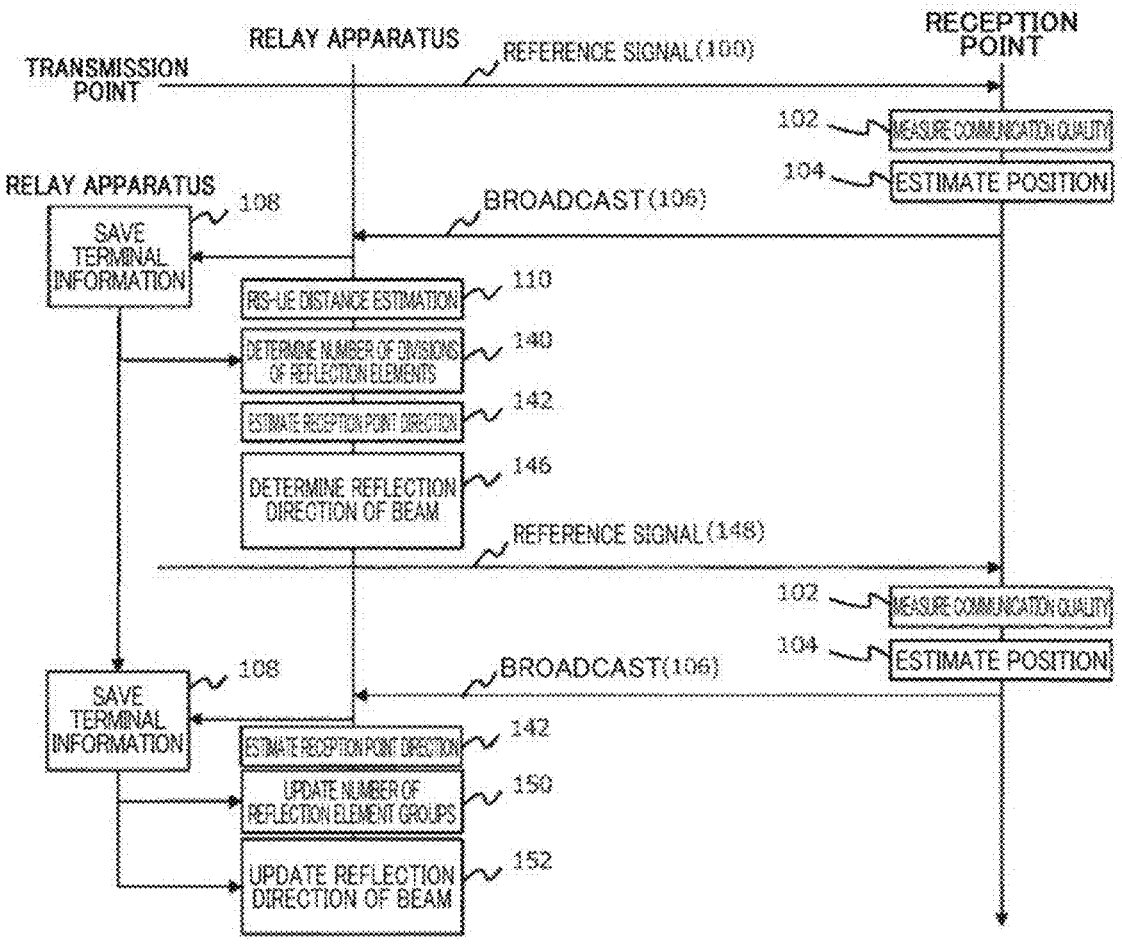
FIG. 6 is a flowchart for illustrating an operation of the relay control system of Embodiment 1 of the present disclosure.

FIG. 6 is a flowchart for illustrating an operation of the relay control system of the present embodiment. In the example illustrated in FIG. 6, first, a reference signal is transmitted from the transmission point 10 (step 100). The reference signal is a signal for measuring communication quality and channel state, and is received by the reception point 20.

At the reception point 20, the communication quality is measured based on the received reference signal (step 102). More specifically, here, the communication quality is, for example, reception power, signal-to-interference power, signal-to-interference noise power, and signal-to-noise power are measured. Channel state information may be estimated together with the communication quality.

Next, at the reception point 20, a process of estimating its own position is performed (step 104). The position estimation can be performed, for example, using a cellular system or a radio LAN access point. More specifically, it can be realized by three-point positioning using received power, arrival time, and arrival time difference, and beacon positioning using Bluetooth low energy (BLE). Alternatively, a pedestrian dead record (PDR, pedestrian autonomous navigation positioning) may be used which estimates the relative positional information using a sensor (acceleration sensor, gyro sensor, or magnetic sensor) mounted on the user terminal UE (reception point 20). Further, the self-position may be estimated by GPS positioning, sonic wave, geomagnetism, UWB positioning, or a combination thereof. In addition, the height information may be included in the self-position.

When the above process is completed, the reception point 20 performs a broadcast process (step 106). Specifically, the identification number of the reception point 20 is transmitted by a broadcast method in addition to the communication quality and position estimation information acquired by the reception point 20 through the processes of steps 102 and 104. Hereinafter, the information transmitted in this manner is referred to as "terminal information". The broadcast method may be a multicast method or a group cast method.

The relay apparatus 30 saves the terminal information transmitted from the reception point 20 in the storage unit 34 (step 108). In this case, the reception time of the terminal information and other information may be recorded in the storage unit 34 together with the terminal information.

In parallel with the above processes, the relay apparatus 30 estimates the distance between the relay apparatus 30 and the reception point 20, that is, the RIS-UE distance, based on the terminal information (step 110). Specifically, when receiving the terminal information from the reception point 20, the relay apparatus 30 determines whether it is necessary to activate the reception point 20. In a case where it is determined that activation is necessary, the RIS-UE distance is calculated using the positional information of the reception point 20 included in the terminal information and the own positional information acquired and registered in advance.

Figure 7:
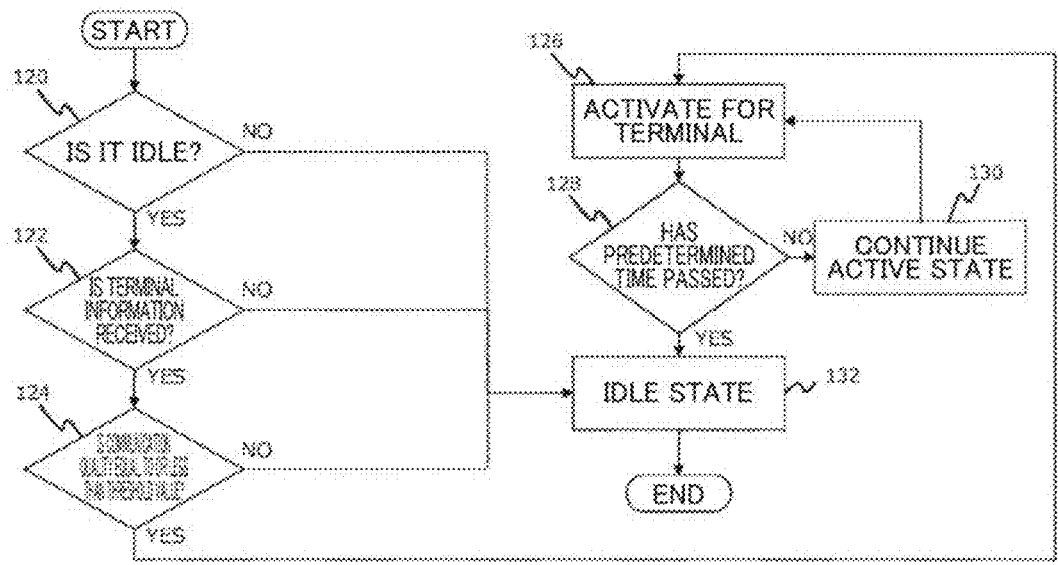
FIG. 7 is a flowchart for illustrating an operation of an active determination process executed by the relay apparatus in Embodiment 1 of the present disclosure.

FIG. 7 is a flowchart for illustrating a flow of processes executed by the relay apparatus 30 to determine whether activation is necessary. The flow of processes for determining activation by temporarily interrupting the illustration of the flow chart illustrated in FIG. 6 will be described below.

The routine illustrated in FIG. 7 is repeatedly started at predetermined intervals in the relay apparatus 30. When this routine is started, it is first determined whether the current state is idle (step 120).

When it is determined that the current state is idle by the above processes, it is determined whether the terminal information has been received from any of the reception points 20 (step 122).

As a result, in a case where the reception of the terminal information is recognized, it is determined whether the communication quality at the reception point 20 from which the terminal information is transmitted is equal to or less than a threshold value based on the "communication quality" included in the terminal information (step 124). The threshold value is a value determined to determine whether the current communication quality is a desired quality or not.

Therefore, in a case where it is determined in step 124 that the communication quality is equal to or less than the threshold value, it can be determined that the desired communication cannot be established with the signal directly received from the transmission point 10 by the reception point 20. In this case, the relay apparatus 30 is activated for the reception point 20 (step 126).

After the process of step 126 is completed, it is determined whether a predetermined time has elapsed since the relay apparatus 30 is activated (step 128).

In a case where it is determined that the predetermined time has not elapsed yet, the active state is continued (step 130). Thereafter, steps 126 to 128 are repeated until the lapse of a fixed time is recognized.

When it is recognized that the time after the activation has reached the predetermined time, the state of the relay apparatus 30 is returned to the idle state (step 132).

According to the above processes, the relay apparatus 30 maintains the active state for a predetermined time after receiving the terminal information from the reception point 20 having poor reception quality, and then returns to the idle state. When the reception point 20 still requires the relay apparatus 30 after returning to the idle state, the processes of steps 122 to 126 are repeated and the relay apparatus 30 is activated again. In addition, if the other reception point 20 different from the reception point 20 requires the relay apparatus 30, the relay apparatus 30 becomes active with respect to the reception point 20. Therefore, if the state of the relay apparatus 30 is controlled by the process illustrated in FIG. 7, the plurality of reception points 20 can be efficiently supported by one relay apparatus 30.

With reference to FIG. 6 again, the illustration of the operation of the relay control system of the present embodiment will proceed. As illustrated in FIG. 6, when the process of step 110 is completed, the relay apparatus 30 determines the number of divisions of the reflection element 42 (step 140). Specifically, here, the number of groups to be applied to the reflection element 42 is determined in order to establish a first contact with the reception point 20 to be activated based on the RIS-UE distance estimated in step 110.

FIG. 8 illustrates an example of a table referred to by the relay apparatus 30 in the process of step 140. However, the table referred to here is not limited to the table illustrated in FIG. 8, and any table may be used as long as the RIS-UE distance is associated with the number of groups of the reflection elements 42.

The table illustrated in FIG. 8 illustrates that the reflection element 42 is divided into eight groups in a case where the RIS-UE distance is less than AA m. Then, as the RIS-UE distance increases, the number of groups decreases from 8 to 4 to 2 to 1. In the step 140, according to the table shown in FIG. 8, the shorter the RIS-UE distance is, the larger the number of groups of the reflection elements 42 is set, and in a case where the RIS-UE distance is equal to or greater than CC m, the number of groups is set to the minimum value "1".

In the flowchart illustrated in FIG. 6, following the process of the step 140, the direction of the reception point 20 to be activated is estimated in the relay apparatus 30 (step 142). Specifically, the direction of the reception point 20 viewed from the relay apparatus 30 is estimated based on the positional information of the reception point 20 stored in the process of the step 108 and the positional information of the reception point 20 acquired in advance. For the relay apparatus 30, the direction of the reception point 20 is a direction in which an incoming wave from the transmission point 10 should be reflected. How the incoming wave is reflected is a function of the installation angle of the relay apparatus 30, more strictly, the installation angle of the reflection unit 40. For this reason, in this step 142, the installation angle of the reflection unit 40 which has been acquired in advance may be reflected in the direction of the reception point 20.

Next, the relay apparatus 30 determines a reflection method of the beam for each of the divided groups (step 146). More specifically, offset angles different for each group of the reflection elements 42 are added to the direction of the reception point 20 estimated in the step 142. The offset angle is previously set for the relay apparatus 30, and as illustrated in FIG. 5B or FIG. 5C, the beams for each group are adjusted to form one collected beam adjacent to each other.

When the reference signal is transmitted from the transmission point 10 after the completion of the above process (step 148), the signal reaches the reception point 20 in the form of a beam characterized by the processes of steps 140 to 146 via the relay apparatus 30. The beam is provided with a width and intensity suitable for setting the position of the reception point 20 within the coverage. Therefore, according to the above process, the first contact with the reception point 20 can be easily established without requiring a large overhead.

Thereafter, at the reception point 20, the above-mentioned processes of the steps 102, 104 and 106 described above are executed again. Thus, the communication quality is measured based on the information received in the form of the beam via the relay apparatus 30, and the position of the reception point 20 is estimated. Then, terminal information including communication quality and positional information is transmitted by a broadcast method.

When receiving the terminal information, the relay apparatus 30 executes the processes of the steps 108 and 142 again. That is, the received terminal information is saved in the storage unit 34, and the direction of the reception point 20 is estimated based on the positional information with improved accuracy.

Then, the relay apparatus 30 starts a process of a second step for improving communication quality. Specifically, the number of groups of the reflection elements 42 is first updated (step 150). The process of the step 150 is executed based on the comparison between the communication quality received last time and the communication quality received this time.

For example, in a case where the communication quality received this time is better than the communication quality received last time, it can be estimated that the current beam falls within the coverage of the reception point 20. If the current beam covers the reception point 20, the communication quality may be further improved if the direction is corrected and the beam width is narrowed to increase the intensity of the beam. Therefore, in a case where the communication quality is improved from the previous time to the current time, the number of groups of the reflection elements 42 is reduced in the step 150 to narrow the beam width by one step.

On the other hand, in a case where the communication quality received this time is equal to or less than the communication quality received last time, it can be estimated that there is a possibility that the current beam does not properly cover the reception point 20. In this case, it is appropriate to increase the beam width to improve the coverage. Therefore, in a case where the communication quality has not been improved from the previous time to the present time, the number of groups of the reflection elements 42 is increased in the step 150 to widen the beam width by one step.

Thereafter, the relay apparatus 30 updates the reflection direction of the beam based on the number of groups determined in the step 150 and the direction estimated in the nearest step 142 (step 152). Specifically, the direction of the reception point 20 is re-estimated using the latest positional information about the reception point 20. Then, the updated number of reflection element groups is applied to the newly estimated terminal direction, and the same process as in the case of the step 146 is performed. In order to re-estimate the direction of the reception point 20, the past positional information of the same reception point 20 obtained so far may be used.

Figure 9:
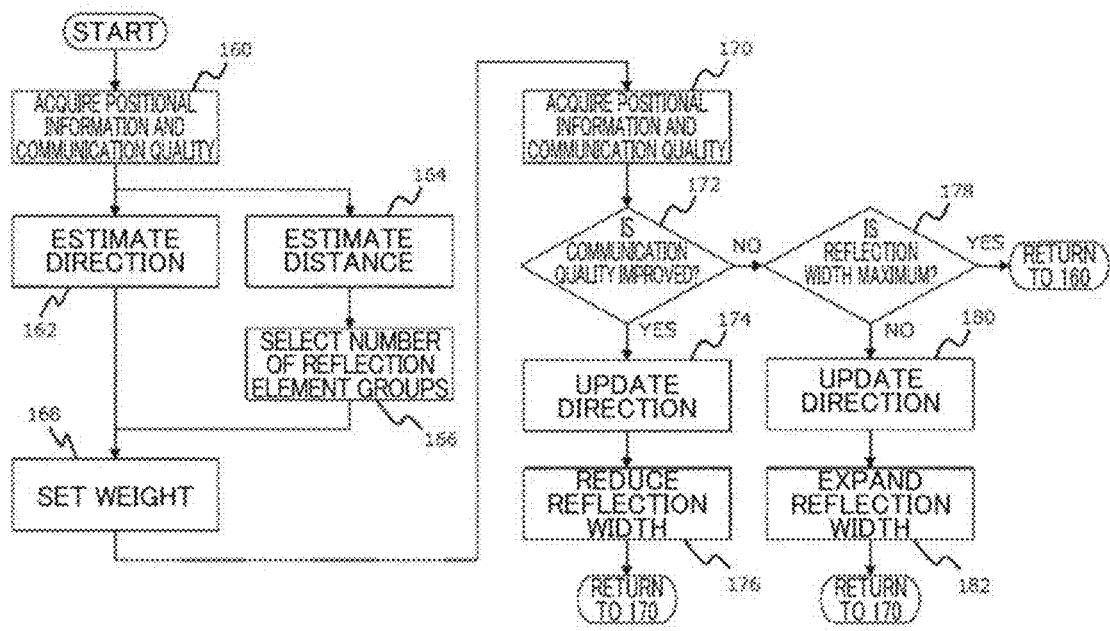
FIG. 9 is a flowchart for illustrating a flow of processes executed by the relay apparatus according to Embodiment 1 of the present disclosure to control the beam width.

FIG. 9 is a flowchart for illustrating a flow of processes executed by the relay apparatus 30 in order to realize the function by the relay control system of the present embodiment. It is assumed that the routine illustrated in FIG. 9 illustrates the flow of processes after the relay apparatus 30 is activated for the specific reception point 20.

In the routine illustrated in FIG. 9, first, the positional information and the communication quality are acquired from the terminal information received from the reception point 20 (step 160).

Then, the direction of the reception point 20 is estimated based on the positional information (162).

In addition to the estimation of the direction, the relay apparatus 30 estimates the distance to the reception point 20 based on the positional information (step 164).

Next, the number of groups of the reflection elements 42 for forming an appropriate beam for setting the position of the reception point 20 within the coverage is selected by a method such as referring to the table shown in the figure (step 166).

Next, a phase weight to be applied to each of the reflection elements 42 is set (step 168). More specifically, the reflection element 42 is divided into one or a plurality of groups based on the number of groups selected in the step 166. Then, phase weights for the respective reflection elements 42 are calculated so that the reflection elements 42 belonging to the respective groups form beams to be formed by the respective groups.

When the relay apparatus 30 receives the reference signal from the transmission point 10 after the completion of the processing, the relay apparatus 30 adds the phase weight to the signal to form a beam toward the reception point 20. When receiving the beam, the reception point 20 transmits the terminal information again.

As illustrated in FIG. 9, when receiving the terminal information thus transmitted, the relay apparatus 30 again acquires the positional information and the communication quality from the terminal information (step 170).

The relay apparatus 30 determines whether the communication quality thus obtained is improved with respect to the communication quality previously obtained (step 172).

As a result, in a case where the quality improvement is recognized, it can be determined that the current beam appropriately falls within the coverage of the reception point 20. In a case where such a determination is obtained, the relay apparatus 30 updates the direction of the reception point 20 based on the newly obtained positional information (step 174).

Further, the relay apparatus 30 reduces the number of groups of the reflection elements 42 to reduce the reflection width in order to further improve the communication quality by increasing the beam intensity (step 176). Thereafter, the relay apparatus 30 returns to the step S170, and repeats the process.

In a case where it is determined in the step 172 that the improvement in the communication quality is not recognized, it can be estimated that there is a possibility that the current beam does not properly cover the reception point 20. In this case, the relay apparatus 30 determines whether the current reflection width is the maximum (step 178).

In a case where it is determined that the current reflection width is not the maximum, it can be determined that there is a room for improving coverage by widening the reflection width. In this case, the relay apparatus 30 first updates the direction of the reception point 20 based on the latest positional information acquired by the process of the step 170 (step 180).

Next, the relay apparatus 30 increases the reflection width for obtaining the improvement of coverage. Specifically, the number of groups of the reflection elements 42 is increased so that the reflection width is increased (step 182). Thereafter, the relay apparatus 30 returns to the step 170, and repeats the processes.

In a case where it is determined in the step 178 that the reflection width has already been maximum, it can be determined that there is no room for improving the coverage by widening the reflection width. In this case, the relay apparatus 30 returns to the step 160 and executes the processes again in order to re-contact the reception point 20 from the beginning.

As described above, according to the relay control system of the present embodiment, the features of the beam generated by the relay apparatus 30 can be made to correspond to the RIS-UE distance. As a result, the first contact for beam search can be quickly established while solving the problem of overhead.

In addition, according to the relay control system of the present embodiment, the features of the beam can be adjusted to improve the communication quality after the relay apparatus 30 establishes the first contact with the reception point 20. Therefore, according to the present embodiment, the communication quality can be efficiently improved after the establishment of the communication via the relay apparatus 30.

In Embodiment 1 described above, as illustrated in FIG. 5B or FIG. 5C, the reflection elements 42 are grouped so that the reflection elements 42 belonging to the same group form one block. However, the method of grouping the reflection elements 42 is not limited to this. As long as a large deviation does not occur in the number of reflection elements 42 belonging to each group, which reflection element 42 is allocated to which group can be freely set including a random combination.

Figure 10:
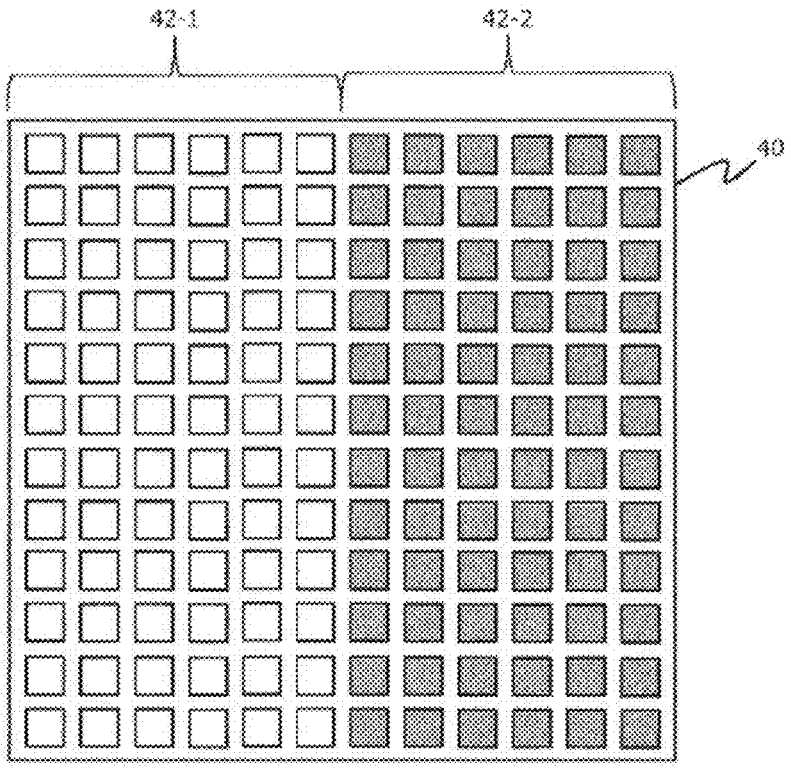
FIG. 10 illustrates an example of the specific allocation of the reflection elements corresponding to the grouping method illustrated in FIG. 5B.

For reference, FIG. 10 illustrates an example of the specific allocation of the reflection elements 42 corresponding to the grouping method illustrated in FIG. 5B. In this case, the reflection unit 40 is divided into a group of reflection elements 42-1 belonging to a left half block and a group of reflection elements 42-2 belonging to a right half block.

Figure 11:
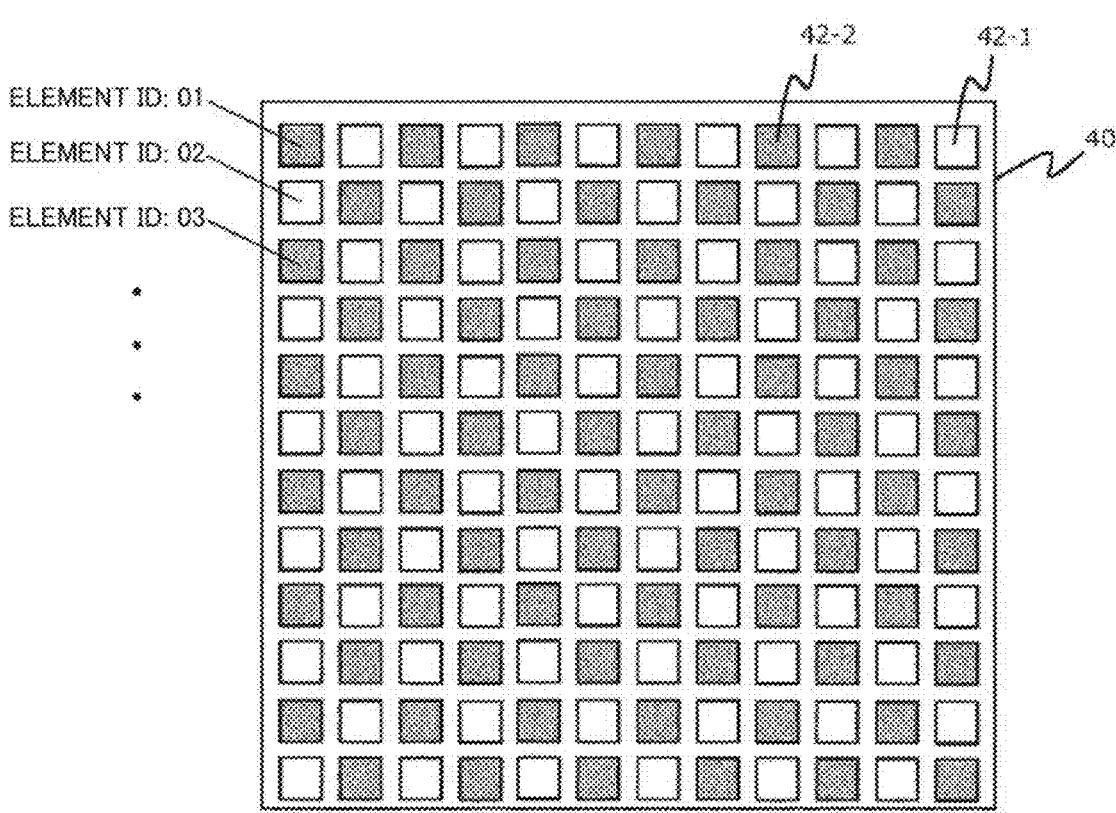
FIG. 11 illustrates another example of dividing the reflection element into two groups.

In addition, FIG. 11 illustrates another example in which the reflection element 42 is divided into two groups. Here, the reflection elements 42-1 belonging to the first group and the reflection elements 42-2 belonging to the second group are alternately arranged. According to the method illustrated in FIG. 11, the number of the reflection elements 42-1 belonging to the first group is equal to the number of the reflection elements 42-2 belonging to the second group. As a result, it is possible to form a beam substantially similar to the case of using the method illustrated in FIG. 10.

REFERENCE SIGNS LIST

10 Transmission point
Reception point
30 Relay apparatus
32 Communication unit
34 Storage unit
36 Beam control unit
38 Phase control unit
40 Reflection unit
42 Reflection element

The invention claimed is:

1. A relay controller using a relay including a plurality of reflectors capable of applying independent phase shifts to incoming waves from a transmission point, the controller is configured to execute:

estimating a distance between the relay and a reception point based on terminal information emitted from the reception point;

determining a number of divisions for grouping the plurality of reflectors based on the distance;

grouping the plurality of reflectors into one or more reflector groups according to the number of divisions;

estimating a position of the reception point based on the terminal information; and applying a phase weight to each of the reflectors so that each of the reflector groups generates a beam toward the position of the reception point.

2. The relay controller according to claim 1, wherein the applying a phase weight to each of the reflectors phase control process includes:

setting an angle toward the position of the reception point;

setting an offset angle for each of the reflector groups; and determining a traveling direction of the beam generated by each of the reflector groups by adding the offset angle to the angle.

3. The relay controller according to claim 2, wherein the offset angle is set so that beams generated by each of the reflector groups are adjacent to each other to form one collected beam.

4. The relay controller according to claim 3, wherein the terminal information includes a communication quality at the reception point, the controller is configured to further execute:

a process of reducing the number of divisions in a case where improvement in the communication quality is recognized; and a process of increasing the number of divisions in a case where improvement in the communication quality is not recognized.

5. The relay controller according to claim 3, wherein the relay is configured to activate the reception point in a case where communication quality related to a signal directly received from the transmission point by the reception point is equal to or less than a threshold value.

6. The relay controller according to claim 5, wherein the relay is configured to release activation of the reception point when a predetermined time elapses after the reception point is activated.

7. The relay controller according to claim 2, wherein the terminal information includes a communication quality at the reception point, the controller is configured to further execute:

a process of reducing the number of divisions in a case where improvement in the communication quality is recognized; and a process of increasing the number of divisions in a case where improvement in the communication quality is not recognized.

8. The relay controller according to claim 2, wherein the relay is configured to activate the reception point in a case where communication quality related to a signal directly received from the transmission point by the reception point is equal to or less than a threshold value.

9. The relay controller according to claim 8, wherein the relay is configured to release activation of the reception point when a predetermined time elapses after the reception point is activated.

10. The relay controller according to claim 1, wherein the terminal information includes a communication quality at the reception point, the controller is configured to further execute:

reducing the number of divisions in a case where improvement in the communication quality is recognized; and increasing the number of divisions in a case where improvement in the communication quality is not recognized.

11. The relay controller according to claim 10, wherein the relay is configured to activate the reception point in a case where communication quality related to a signal directly received from the transmission point by the reception point is equal to or less than a threshold value.

12. The relay controller according to claim 11, wherein the relay is configured to release activation of the reception point when a predetermined time elapses after the reception point is activated.

13. The relay controller according to claim 1, wherein the relay is configured to activate the reception point in a case where communication quality related to a signal directly received from the transmission point by the reception point is equal to or less than a threshold value.

14. The relay controller according to claim 13, wherein the relay is configured to release activation of the reception point when a predetermined time elapses after the reception point is activated.

15. A relay comprising a plurality of reflectors capable of applying independent phase shifts to incoming waves from a transmission point, wherein the relay is configured to executes:

estimating a distance to a reception point based on terminal information emitted from the reception point;

determining a number of divisions for grouping the plurality of reflectors based on the distance;

grouping the plurality of reflectors into one or a plurality of reflector groups according to the number of divisions;

estimating a position of the reception point based on the terminal information; and applying a phase weight to each of the reflectors so that each of the reflector groups generates a beam toward the position of the reception point.

16. A relay control method using a relay including a plurality of reflectors capable of applying independent phase shifts to incoming waves from a transmission point, the method comprising:

estimating a distance between the relay and a reception point based on terminal information emitted from the reception point;

determining a number of divisions for grouping the plurality of based on the distance;

a step of grouping the plurality of reflectors into one or a plurality of reflector groups according to the number of divisions;

estimating a position of the reception point based on the terminal information; and applying a phase weight to each of the reflectors so that each of the reflector groups generates a beam toward the position of the reception point.

* * * * *